Nov. 1, 1960     D. M. PALMER     2,958,161
METHOD OF MELTING GLASS

Filed Aug. 13, 1957     3 Sheets-Sheet 1

INVENTOR.
DELOS M. PALMER
BY
ATTORNEY

INVENTOR.
DELOS M. PALMER
BY
ATTORNEY

Nov. 1, 1960   D. M. PALMER   2,958,161
METHOD OF MELTING GLASS

Filed Aug. 13, 1957   3 Sheets-Sheet 3

INVENTOR.
DELOS M. PALMER
BY
ATTORNEY

United States Patent Office 2,958,161
Patented Nov. 1, 1960

2,958,161
METHOD OF MELTING GLASS
Delos M. Palmer, 4156 Indian Road, Toledo, Ohio
Filed Aug. 13, 1957, Ser. No. 677,926
1 Claim. (Cl. 49—77)

This invention relates to melting methods but particularly to a method of melting glass.

One of the major problems in the glass industry is the melting of the glass batch into glass which will have the proper homogeneity i.e. the absence of cords, reams, stones, striae, etc. Present day high production melting furnaces consist generally of a large and long melting zone with a smaller section for the fining zone plus regenerative checker work underneath the furnace for preheating combustion air by the flue gases.

It has been assumed that a long melting zone will give the molten glass ample opportunity to be, by convection currents, well mixed to promote homogeneity by the time the glass reaches the fining zone. However, this is not always the case because experience has shown that at times a lot of non-homogeneity occurs in the molten glass drawn off. Also, considering the job of melting and fining the glass melt, this type of furnace represents a huge investment.

It is a desideratum to overcome the above difficulties and produce a more simple and efficient method of melting glass and a furnace which is not only less expensive to build, has reduced fuel consumption and reduced operating costs, but also produces a high and uniform quality of glass and has greater flexibility in operation.

Another object is to produce a new and improved method of melting glass in which the ingredients are introduced in granular or pellet form into a closed chamber under pressure where the pellets are first preheated and subsequently are fed in a controlled manner to a melting chamber after which the molten glass is drawn off.

A further object is to produce a simple and efficient method of melting glass in which spray dried pellets containing the proper ingredients for the glass are first preheated in a closed chamber and then introduced in a controlled manner into a melting chamber, the preheating and melting chambers being maintained under a predetermined pressure.

Other objects and advantages of the invention reside in the novel steps of operation and the details of construction and arrangement of the parts making up the melting furnace, and for purposes of illustration but not of limitation, an embodiment of the invention is shown on the accompanying drawings in which Figure 1 is a vertical sectional elevation of a glass melting furnace;

Figure 1:
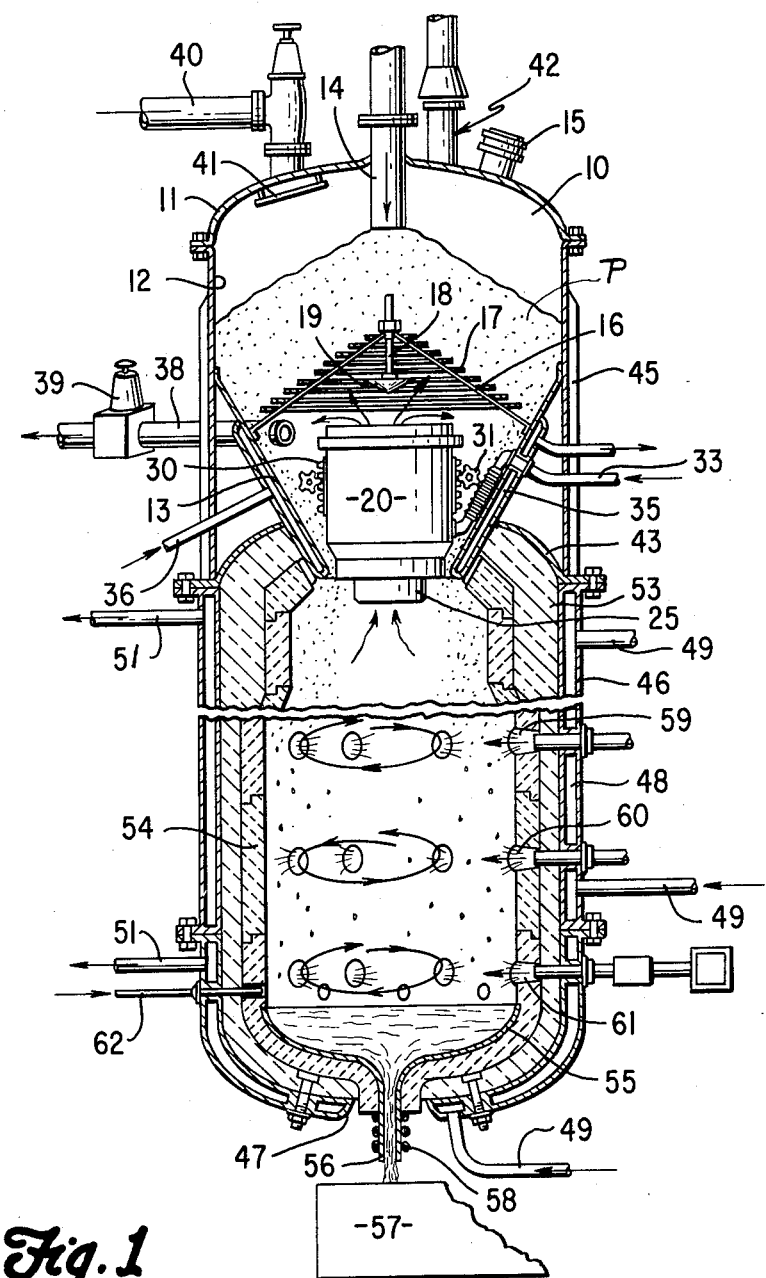
Figure 2:
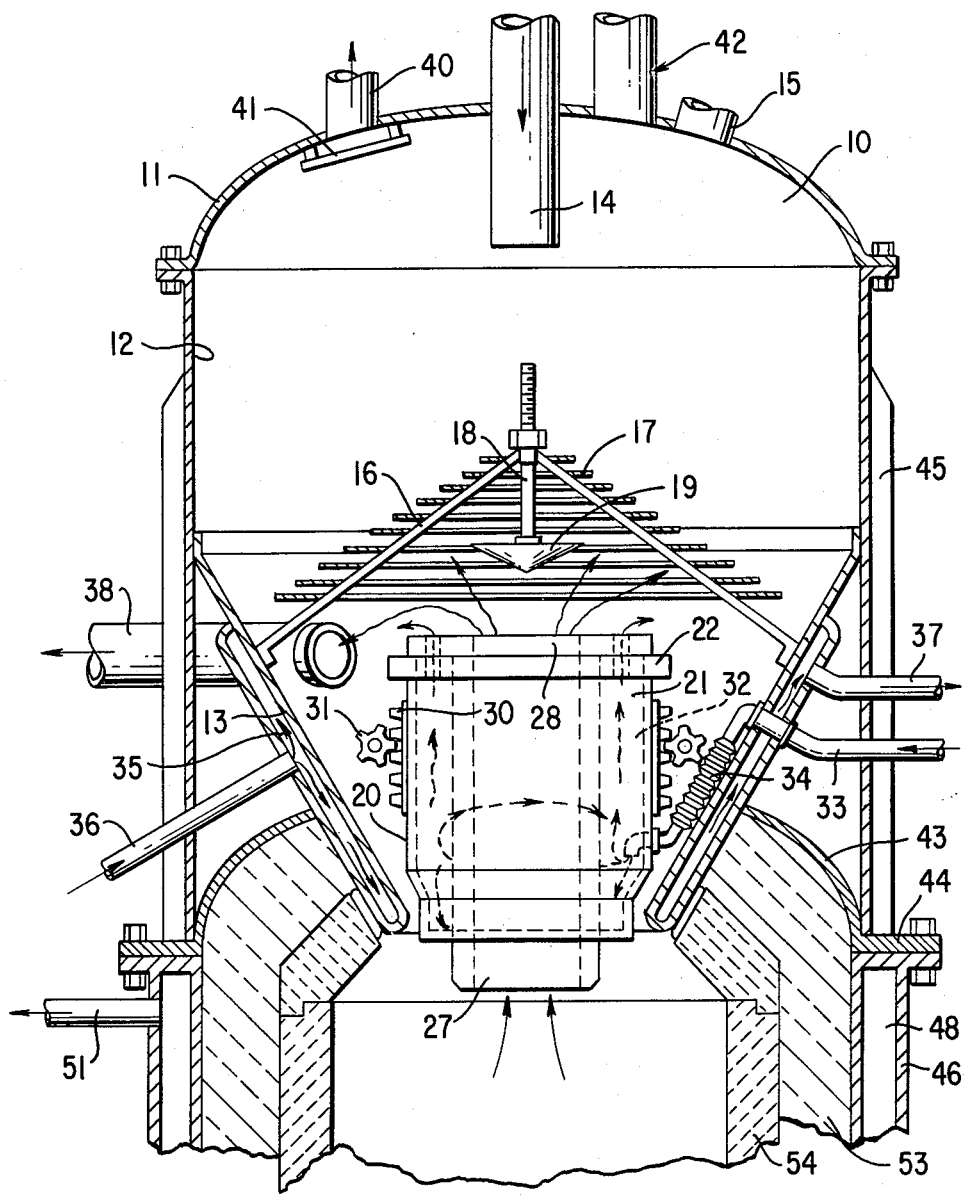
Figure 2 is an enlarged fragmentary vertical sectional view of the upper portion of the glass furnace showing particularly the preheating chamber, the valve mechanism and the baffle arrangement for preheating the material and controlling its passage from the preheating chamber into the melting chamber.
Figure 3:
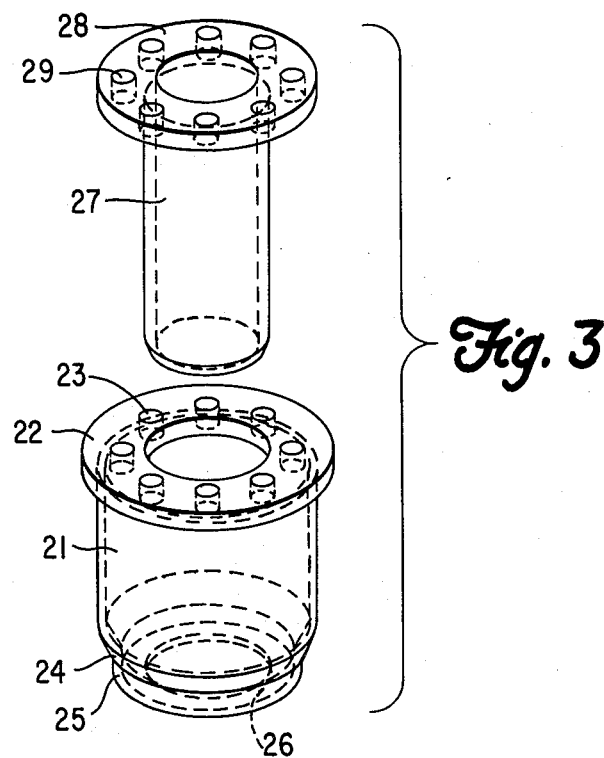
Figure 3 is a composite view showing the principal parts which combine to form the control valve assembly, the ratchets being omitted.

The illustrated embodiment of the invention comprises an upper charging chamber or preheating zone 10 which is provided with a closed dome-like top 11, a cylindrical body 12 and a funnel-like bottom portion 13 which, as will hereinafter appear, provides a valve seat. Centrally of the dome top 11 and extending inside of the closed charging chamber is an inlet pipe 14 for introducing the glass-making ingredients in pellet or granualr form P, these being spray dried as will hereinafter be explained. Also in dome top 11 is an inspection device 15 of the usual type.

Secured to the funnel-like bottom portion 13 near its upper end is an inverted cone-like spider 16 which is formed by a plurality of rods fixed to the funnel-like portion and inclining upwardly and inwardly to a peak. Resting upon the spider 16 is a series of flat metallic annuli or washer-like plates 17 which starting from the top down are of increasing diameter thereby creating a baffle over which the spray dried pellets drop and are consequently diverted laterally to the space between the lowermost annulus 17 and the funnel portion 13, from which the pellets flow downwardly along the bottom portion of the funnel. It will be observed that the various annuli are spaced from each other to enable heated gases to pass to contact the pellets P and preheat them before they are passed to the melting chamber. The temperature within the preheating chamber 10 must be kept below 900° F. so that the pellets will not reach such a state of plasticity that would interfere with their free flow.

Depending from the upper end of the spider 16 is a rod 18 which carries at its lower end a refractory baffle cone 19 for causing the heated gases to pass somewhat laterally through the spaces between the several annuli 17.

Vertically reciprocable within the preheating chamber and disposed within the funnel-like portion 13 is a valve 20. This valve may be automatically raised or lowered in response to the change in level of the molten glass in the melting chamber, thereby to feed a regulated quantity of preheated spray dried pellets P to the melting chamber in accordance with the demand. No mechanism has been illustrated for accomplishing this but the same is well known in the art and may consist of a float within the melting chamber energizing a reversible motor for effecting the desired up or down movement of the valve 20.

The valve 20 consists of an outer cylinder 21 which may be of nickel chromium alloy and is formed with an outwardly extending flanged head 22 at the upper end which extends beyond the side walls of the cylinder 21. Formed in the flanged head 22 and disposed outside of the cylinder is a series of vertical ports 23. The lower portion of the cylinder is formed with a downwardly and inwardly tapered valve portion 24 and integral therewith is a cylindrical lower end portion 25. The lower end of the cylindrical end portion or extension 25 is formed with an inwardly extending radial wall 26 which extends at substantially right angles to the axis of the cylinder and engages the outer wall of the inner cylinder 27 as will hereinafter appear.

Fitting within the outer cylinder 21 is an elongate cylinder 27 of refractory material which has a flanged radially extending upper head 28 which is adapted to rest upon the flanged head 22 of the outer cylinder. Formed in the flanged head 28 is a series of ports 29 which register with the ports 23 respectively in the head 22. It will be noted that the lower end of the inner cylinder 27 depends below the lower end of the outer cylinder 21 and the inwardly extending radial wall 26 abuts against the outer wall of the inner cylinder, thereby providing a chamber completely surrounding the inner cylinder as will hereinafter be explained.

Suitably mounted on the outer wall of the outer cylinder 21 and arranged in diametrically opposed relation is a pair of vertically disposed racks 30 and engageable with each rack is a pinion 31 which is suitably actuated for raising or lowering the control valve 20. Manifestly in its lowermost position the inwardly tapered valve portion 24 of the outer cylinder will abut against or seat against the lower end portion of the funnel-like or cone portion 13, thereby preventing any flow of pellets from the preheating or charging chamber into the melting chamber. By raising the control valve to a greater or less extent the quantity of pellets P introduced into the melting chamber can be controlled. As above explained the pinions 31 may be automatically controlled in response to the level of molten glass within the melting chamber, the arrangement being such that more pellets will be permitted to enter the melting chamber when the level of the molten glass in the melting chamber is low and when the molten glass rises to a predetermined point, the flow of pellets P may be either greatly reduced or stopped.

As above indicated there is a space 32 between the inner wall of the outside cylinder 21 and the outside wall of the inner cylinder 27 and into this space adjacent the lower portion thereof cooling air is introduced in any suitable manner through a pipe 33 which has a flexible portion 34 to enable the up and down movement of the control valve without interfering with the air flow. The cooling air thus introduced into the space 32 moves upwardly and through the registering ports 23 and 29 and thence out in a generally lateral direction between the annuli 17. This cooling air during its travel will be heated and heat thus introduced into the supply of pellets in the charging or preheating chamber 10 will assist in preheating them. The products of combustion will pass centrally through the refractory cylinder 27 and contribute principally to the preheating of the pellets before they reach the melting chamber.

Enclosing the funnel-like or cone portion 13 is a cooling jacket 35 into which low pressure air is delivered through a pipe 36 from any suitable source. The air may be discharged from the jacket 35 from an outlet pipe 37.

In the region of a spider and at the side of the control valve 20 is a pipe 38 which leads to the outside and provides a by-pass for furnace exhaust gases from the valve 20. A valve 39 controls the flow through the by-pass pipe 38. A second furnace gas outlet which may be valve controlled is at the top of the dome 10 and is indicated at 40, a baffle 41 being disposed directly beneath the mouth of the pipe 40. Also mounted in the dome 10 is a safety head 42 of any usual or well known construction.

A dome-like head 43 provides the top of the melting chamber and is suitably secured to the outer wall of the jacket 35 intermediate the ends thereof and on the lower portion of the dome is an outwardly extending flange 44 and on this flange rests the cylindrical body 12 of the preheating or charging chamber. Rising from the flange 44 and suitably secured to the outside of the cylinder 12 is a plurality of stiffener bars 45. Suitably bolted to the underside of the flange 44 is a generally cup-shaped housing 46 which has a central opening in the bottom thereof indicated at 47. The housing 46 is provided with an outer cooling water jacket 48 and water is fed to this jacket by a plurality of inlet pipes 49. Outlet pipes 51 on the opposite side of the housing provide for the discharge of water circulated within the jacket. Lining the inside of the housing 46 as well as the dome 43 is suitable heat insulation material 53 and on the inside of this insulation are refractory blocks 54 which completely line the inside of the melting chamber.

In the bottom portion of the melting chamber is a refractory metal liner 55 of cup formation having a central depending discharge spout 56 which extends through the opening 47. The metal for this liner may be in sheet form and of titanium, molybdenum, tungsten (powdered and silver or copper binder) or zirconium. It will be observed that a portion of the spout 56 projects beyond the refractory liner and this may be encircled by a water cooled high frequency electrical coil 58. This may be used for opening up or uncorking the passage through the spout when commencing operations or resuming operations after the furnace has been idle. The spout 56 discharges into a suitable holding furnace 57 where the molten glass is received.

Extending through the walls of the melting furnace are vertically spaced series of firing zones served by vertically spaced rows of burners 59, 60 and 61. The number of these firing zones may be varied as conditions require but the burners of the row 59 are inclined to direct the flames as indicated by the arrows associated therewith in Figure 1. Then the burners in the row 60 disposed below the burners 59 are inclined in an opposite direction and further the row of burners 61 in the lowermost row are directed oppositely to those of the burners of the row 60. This arrangement of the burners provides a turbulence and more efficient heat distribution for heating the pellets as they drop in the melting chamber. Free oxygen is introduced near the lower end of the melting furnace through the pipe 62.

Figure 4:
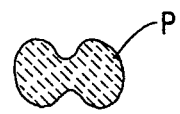
Figure 4 is an enlarged sectional view of one of the spray dried pellets.

Figure 4 illustrates a sectional view of one of the pellets or granules P which are introduced into the charging chamber 10. Each pellet contains the necessary ingredients for the glass such for example as soda ash, glass sand, lime and cullet and are produced by spray drying. In such process droplets of the batch slip are thrown out from a spinning cone by centrifugal force. When the droplets leave the spinner or inverted cone, the particles revolve in a heated atmosphere, hence the shape after having dried with most of the moisture coming out from the core. Reference is hereby made to United States Patent 2,062,907 dated December 1, 1936 to Frank H. Riddle wherein the method of spray drying is fully disclosed. The spray dried pellets should be stored in air tight drums from which they flow by gravity into the charging chamber 10. Since the charging or preheating chamber 10 is under the same pressure as the melting chamber, the pellets P flow freely by gravity and in the charging chamber they are preheated to approximately 800° F. before dropping in and through the firing zones of the melting chamber. By using the batch in pellet form of uniform size a very permeable batch is had for preheating with furnace gases in the chamber 10. As above mentioned it is important that the pellets P do not reach a temperature over 900° F. in the preheating chamber because a plastic state may be reached which would interfere with their free flow. In the preheating chamber 10 the pellets are supported by the annuli 17 which as above pointed out are spaced to allow escapement of furnace gases laterally and upwardly through the mass. The control valve 20 is air cooled with the air escaping from the inlet pipe 33. Additionally the valve seat is air cooled by the jacket 35 with low pressure air which is independent of the furnace pressure.

By employing a multiplicity of firing zones in the melting chamber and through the operation of the control valve 20 the regulation of the heat input into the firing zone is made possible for optimum conditions of melting the pellets as they completely melt in suspension on their way down to the shallow furnace bottom below. According to this design it is not necessary to have a large quantity of glass in the bottom of the melting chamber. This is conducive to safe operation. The pellets are melted for immediate use out of the furnace.

By melting the pellets P under pressure, the fuel used and the size of the furnace are substantially reduced and quite high thermal efficiencies can be obtained. It is possible to have the furnace operating at a pressure of fifteen or more pounds per square inch gage having approximately one-sixth the size of glass melting furnaces presently in use. This furnace may operate at an efficiency of 50% to 65% with complete safety.

It will be understood that numerous changes in details of construction, arrangement and choice of materials may be effected without departing from the spirit of the invention, especially as defined in the appended claim.

What I claim is:

The method of melting glass which consists in gravitating pellets containing the necessary ingredients for glass through an enclosed preheating zone, contacting and preheating said gravitating pellets to a temperature not exceeding 900° F. in said preheating zone with hot gases emanating from an enclosed melting zone maintained below said preheating zone, gravitating said preheated pellets from said preheating zone to the upper portion of said melting zone, blasting hot gases horizontally into said melting zone from a plurality of vertically disposed firing zones, said blasts entering said melting zone in opposite directions from alternate firing zones, imparting movements to said pellets in a direction transverse to said melting zone and solely in response to said blasts, whereby said pellets during gravitation through said melting zone are successively thrown first in one horizontal direction and then in the opposite horizontal direction and said pellets are maintained in suspension for a sufficient period of time to insure complete melting thereof.

References Cited in the file of this patent
UNITED STATES PATENTS

| | | |
|---|---|---|
| Re. 19,788 | Amsler | Dec. 17, 1935 |
| Re. 20,828 | Powell | Aug. 16, 1938 |
| 1,371,084 | Ferguson | Mar. 8, 1921 |
| 2,025,799 | Burgoyne et al. | Dec. 31, 1935 |
| 2,062,907 | Jeffery et al. | Dec. 1, 1936 |
| 2,509,390 | Gaunder | May 30, 1950 |
| 2,634,116 | Witt | Apr. 7, 1953 |